United States Patent
Kim et al.

(10) Patent No.: US 7,970,363 B2
(45) Date of Patent: Jun. 28, 2011

(54) TERMINAL AND METHOD FOR CONTROLLING TRANSMISSION POWER

(75) Inventors: Dae-Ho Kim, Daejeon (KR); Jun-Woo Kim, Daejeon (KR); Kyung-Yeol Sohn, Daejeon (KR); Hyeong-Sook Park, Daejeon (KR); Youn-Ok Park, Daejeon (KR)

(73) Assignees: Samsung Electronics Co., Ltd., Suwon-si (KR); Electronics and Telecommunications, Daejeon (KR); SK TELECOM Co., Ltd., Seoul (KR); KT Corporation, Seongnam (KR); HANARO TELECOM, Inc., Seoul (KR)

( * ) Notice: Subject to any disclaimer, the term of this patent is extended or adjusted under 35 U.S.C. 154(b) by 574 days.

(21) Appl. No.: 12/095,275

(22) PCT Filed: Dec. 8, 2006

(86) PCT No.: PCT/KR2006/005318
§ 371 (c)(1),
(2), (4) Date: May 28, 2008

(87) PCT Pub. No.: WO2007/067004
PCT Pub. Date: Jun. 14, 2007

(65) Prior Publication Data
US 2008/0287078 A1    Nov. 20, 2008

(30) Foreign Application Priority Data

Dec. 8, 2005   (KR) .................. 10-2005-0119930
Nov. 29, 2006  (KR) .................. 10-2006-0118803

(51) Int. Cl.
H01Q 11/12    (2006.01)
H04K 3/00     (2006.01)

(52) U.S. Cl. .............. 455/127.1; 455/69; 455/522
(58) Field of Classification Search ............... 455/69, 455/127.1–127.4, 522; 370/208
See application file for complete search history.

(56) References Cited

U.S. PATENT DOCUMENTS

| 6,256,502 | B1 | 7/2001 | Santa et al. |
| 7,324,828 | B2 * | 1/2008 | Nagaoka et al. ............. 455/522 |
| 2005/0009551 | A1 * | 1/2005 | Tsai et al. ..................... 455/522 |
| 2005/0286547 | A1 * | 12/2005 | Baum et al. .................. 370/437 |

FOREIGN PATENT DOCUMENTS

EP    944 182 A2    9/1999
(Continued)

OTHER PUBLICATIONS

Xiaoyu Fu and Hlaing Minn, Initial Uplink Synchronization and Power Control (Ranging Process) for OFDMA Systems, Globecom 2004, Communications Society, pp. 3999-4003, 2004 IEEE, Dallas, Texas.

*Primary Examiner* — Lee Nguyen
(74) *Attorney, Agent, or Firm* — Jefferson IP Law, LLP

(57) ABSTRACT

A terminal of a communication system includes a power amplifier, an open-loop power controller, a gain controller, a modulator, and a digital/analog converter. The power amplifier amplifies transmission power of a transmission signal. The open-loop power controller measures a received signal strength to control the transmission power, and increases a gain of the power amplifier according to the received signal strength. The gain controller sets a power concentration gain and applies the power concentration gain to the transmission signal when the gain of the power amplifier is maximized. The modulator modulates the transmission signal. The digital/analog converter converts an input signal to an analog signal. The gain controller applies the power concentration gain to the trans mission signal modulated by the modulator, and transmits the power concentration gain to the digital/analog converter.

16 Claims, 3 Drawing Sheets

FOREIGN PATENT DOCUMENTS

| | | |
|---|---|---|
| KR | 10-2004-0028490 A | 4/2004 |
| KR | 10-2004-0054844 A | 6/2004 |
| WO | 01/05057 A1 | 1/2001 |
| WO | 02/49305 A2 | 6/2002 |

* cited by examiner

[Fig. 1]
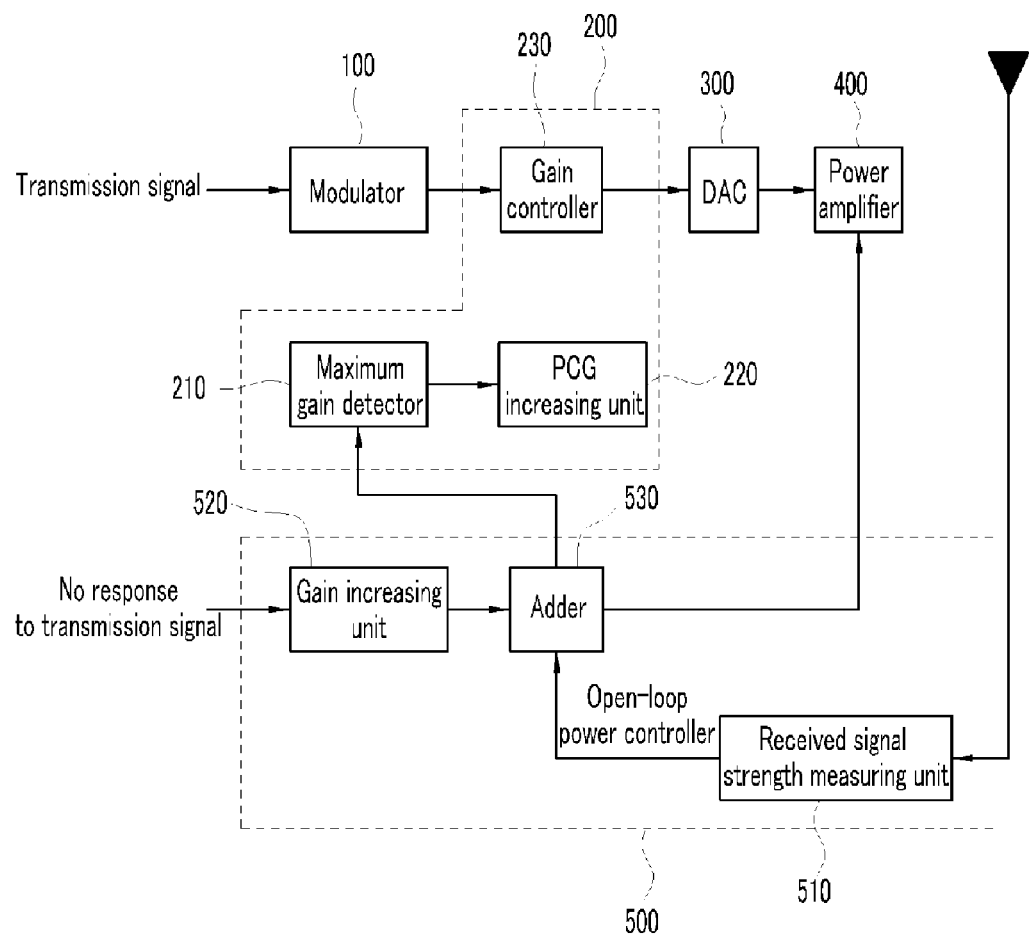

[Fig. 2]
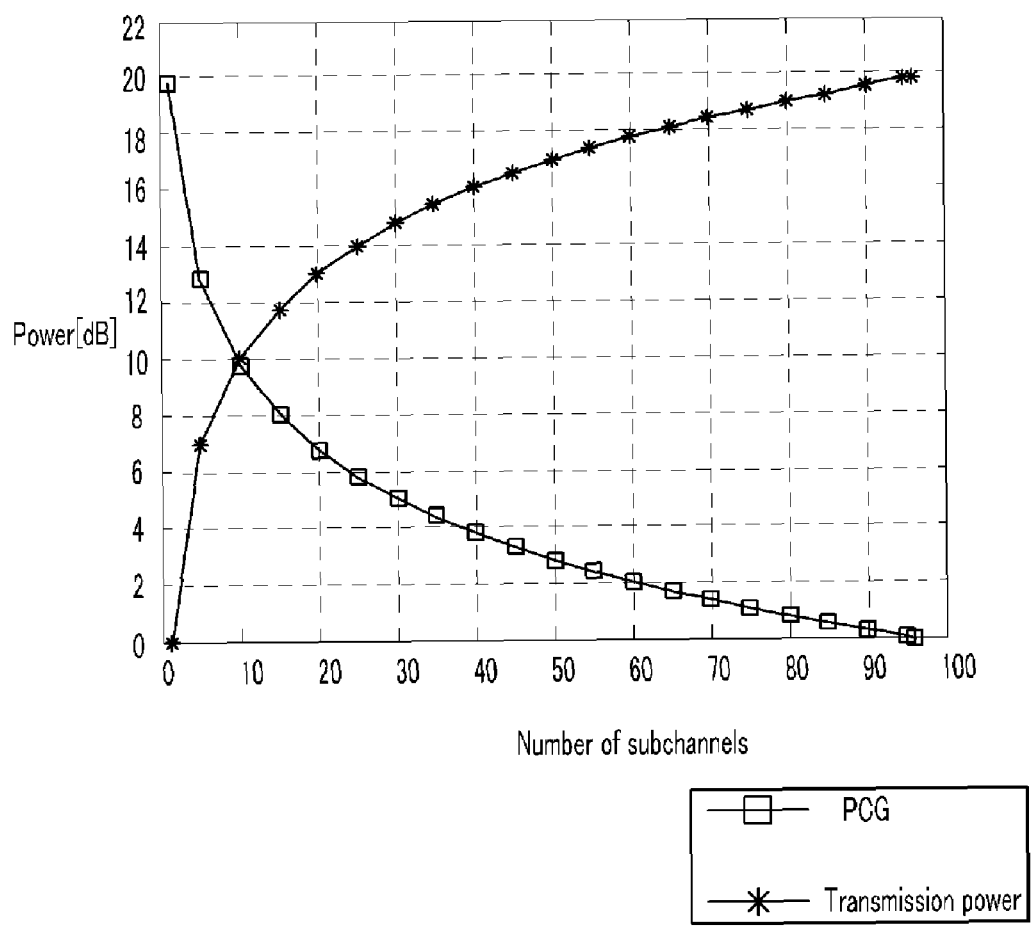

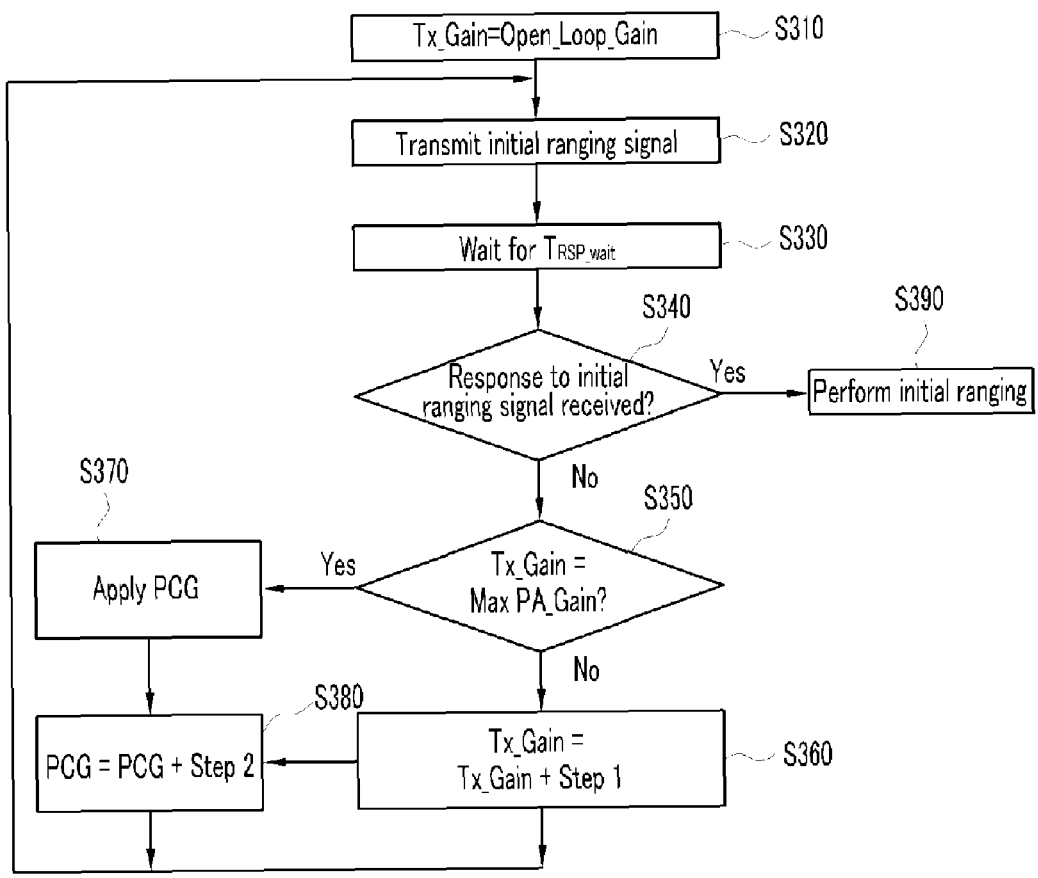
[Fig. 3]

TERMINAL AND METHOD FOR CONTROLLING TRANSMISSION POWER

TECHNICAL FIELD

The present invention relates to a terminal of a communication system. More particularly, the present invention relates to a method for controlling transmission power of a terminal.

BACKGROUND ART

A power controlling method in a communication system is one of radio resource management methods for efficiently using limited frequency resources, and it solves a near-far problem.

In a code division multiple access (CDMA) communication system, since a terminal uses one code channel, transmission power of the terminal is determined by a gain of a power amplifier. Accordingly, in the CDMA communication system, an open-loop power control operation for compensating a path loss caused by a distance between a base station and the terminal, and a power control operation for compensating inaccuracy of the open-loop power control operation, are performed by controlling the gain of the power amplifier. Since the terminal uses one code channel in the CDMA communication system, the gain of the power amplifier may be controlled to perform the power control operation in a cell.

Differing from the CDMA communication system, in an orthogonal frequency division multiplexing access (OFDMA) communication system, the transmission power of the terminal is set to be lower than that of the base station so that one subchannel may be used in a cell boundary area. Accordingly, since the terminal may use subchannels from a single subchannel to all subchannels, the limit of a full loading range (FLR), which is a distance in which the terminal may use all the subchannels, may be restricted. In the FLR, the power amplifier of the terminal uses a maximum gain.

Accordingly, the terminal positioned outside the FLR may not perform the open-loop power control operation for increasing the gain of the power amplifier to compensate the path loss that increases according to an increase of the distance between the base station and the terminal. In addition, since an initial ranging (IR) signal transmitted by the terminal outside of the FLR has a low strength when it is received by the base station, an initial ranging operation may not be performed.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a terminal for performing an open-loop power control operation and a transmission power controlling method thereof.

Technical Solution

An exemplary terminal includes a power amplifier, an open-loop power controller, and a gain controller. The power amplifier amplifies transmission power of a transmission signal. The open-loop power controller measures a received signal strength to control the transmission power, and increases a gain of the power amplifier according to the received signal strength. The gain controller sets a power concentration gain and applies the power concentration gain to the transmission signal when the gain of the power amplifier is maximized.

In this case, the power concentration gain may be determined by extra power generated according to the number of subchannels used in the transmission signal by the terminal, and a maximum value of the power concentration gain is determined by a difference between power according to the number of subchannels used in the transmission signal and power according to all subchannels.

When the terminal does not receive a response to the transmission signal, the open-loop power controller may increase the gain.

When the terminal has not received a response to the transmission signal after applying the power concentration gain to the transmission signal, the gain controller may increase the power concentration gain and apply the power concentration gain to the transmission signal.

In an exemplary method for controlling transmission power in a terminal according to another embodiment of the present invention, a transmission signal is transmitted after transmission power of the transmission signal is amplified by applying a first gain to the transmission signal. It is checked whether the first gain is a maximum value when there is no response to the transmission signal, and a second gain is applied to the transmission signal when the first gain is the maximum value.

An exemplary recording medium according to an embodiment of the present invention records a program for realizing a method by a terminal. In the method: a digital transmission signal is converted to an analog transmission signal; the analog transmission signal is transmitted after transmission power is amplified by applying a first gain to the analog transmission signal; it is checked whether the first gain is a maximum value when there is no response to the analog transmission signal; and a second gain is applied to the digital transmission signal by setting the second gain when the first gain is the maximum value.

Advantageous Effects

According to the exemplary embodiment of the present invention, when the terminal uses the maximum gain of the power amplifier, the open-loop power control operation may be performed by controlling the power concentration gain. Accordingly, the terminal positioned outside the FLR may normally perform the initial ranging operation.

BRIEF DESCRIPTION OF THE DRAWINGS

FIG. 1 schematically shows a block diagram representing a terminal of a communication system according to an exemplary embodiment of the present invention.

FIG. 2 schematically shows a graph representing transmission signal characteristics according to a variation of the number of subchannels in the communication system.

FIG. 3 schematically shows a flowchart of a method for controlling transmission power according to the exemplary embodiment of the present invention.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, the word "block" will be understood to indicate a unit for processing at least one function or operation, which may be realized by hardware, software, or a combination thereof.

A terminal of a communication system according to an exemplary embodiment of the present invention, and a transmission power controller and a transmission power control method, will be described with reference to the drawings. In the exemplary embodiment of the present invention, an orthogonal frequency division multiplexing access (OFDMA) communication system will be exemplified.

Firstly, the terminal of a communication system according to an exemplary embodiment of the present invention and the transmission power controller will be described with reference to FIG. 1. FIG. 1 schematically shows a block diagram representing the terminal of the communication system according to the exemplary embodiment of the present invention.

As shown in FIG. 1, the terminal according to the exemplary embodiment of the present invention includes a modulator 100, a gain controller 200, a digital/analog converter (DAC) 300, a power amplifier 400, and an open-loop power controller 500.

The modulator 100 modulates a transmission signal to be transmitted to a base station (not shown). The open-loop power controller 500 measures a received signal strength, determines an open-loop power control value and a gain of the power amplifier 400, and transmits the open-loop power control value and the gain to the power amplifier 400. The gain controller 200 applies a power concentration gain (PCG) to a modulated digital transmission signal when the gain of the power amplifier 400 is maximized. The DAC 300 converts the digital transmission signal modulated by the modulator 100 or the digital transmission signal to which the PCG is applied into an analog signal, and transmits the analog signal to the power amplifier 400. The power amplifier 400 uses the open-loop power control value and the gain to amplify power of the analog signal.

In this case, the gain controller 200 includes a maximum gain detector 210, a power concentration gain increasing unit (hereinafter referred to as a "PCG increasing unit") 220, and a gain controller 230, and the open-loop power controller 500 includes a received signal strength measuring unit 510, a gain increasing unit 520, and an adder 530.

In the open-loop power controller 500, the received signal strength measuring unit 510 measures a strength of a signal that is currently received from the base station (i.e., an average power level of the currently received signals) to output the open-loop power control value. The gain increasing unit 520 increases the gain of the power amplifier 400 when there is no response to the transmission signal from the base station for a predetermined time. The adder 530 transmits a value obtained by adding the open-loop power control value and the gain of the power amplifier 400 to the power amplifier 400. The open-loop power control value corresponds to a negative value of the received signal strength.

In the gain controller 200, the maximum gain detector 210 controls the PCG increasing unit 220 when the gain of the power amplifier 400 is maximized. When the gain of the power amplifier 400 is maximized, the PCG increasing unit 220 transmits the PCG to the gain controller 230, and the gain controller 230 applies the PCG to the transmission signal modulated by the modulator 100. In this case, the PCG increasing unit 220 may increase the PCG by a predetermined value when the transmission power is low.

After the gain controller 230 applies the PCG to the transmission signal, the transmission power
Tx_power
of the power amplifier 400 is given as Math Figure 1. When the PCG is not applied since the gain of the power amplifier 400 is not maximized, the transmission power
Tx_power
of the power amplifier 400 is given as Math Figure 2.

$$\text{Tx\_power} = -\text{mean\_rx\_power} - PowerOffset + PCG \cdot P(N_{SCH}) + \text{NOM\_PWR} + \text{INIT\_PWR} \quad \text{Math FIG. 1}$$

$$\text{Tx\_power} = -\text{mean\_rx\_power} - PowerOffset + P(N_{SCH}) + \text{NOM\_PWR} + \text{INIT\_PWR} + \sum \text{Access Channel Correction} \quad \text{Math FIG. 2}$$

In Math Figures 1 and 2,
mean_rx_power
denotes the received signal strength,
PowerOffset
denotes a constant set to use a maximum transmission output when the received signal strength of the terminal is minimized,
$N_{SCH}$
denotes the number of subchannels used by the terminal, i.e., the number of subchannels used in the transmission signal by the terminal, PCG denotes a power concentration gain,
$P(N_{SCH})$
denotes power determined according to the number
$N_{SCH}$
of subchannels, and
NOM_PWR
and
INIT_PWR
respectively denote nominal power and initial adjustment as system parameters. In Math Figure 2,
ΣAccess Channel Correction
denotes a sum of gains increased by the power amplifier 400 for the response to the transmission signal. In this case,
Tx_power
and
mean_rx_power
may be respectively expressed as [dBm], and
NOM_PWR
and
INIT_PWR
may be expressed as [dB].

A sign "−" in front of the average power
mean_rx_power
of the received signal in Math Figures 1 and 2 is used to increase the transmission power when the received power is weak, and to decrease the transmission power when it is strong. As described, the open-loop power controller 500 transmits the open-loop power control value
−mean_rx_power−PowerOffset
to the power amplifier 400, and may perform the open-loop power control operation by increasing the transmission power when the received signal strength is low and decreasing the transmission power when the received signal strength is high.

The PCG determined by the PCG increasing unit 220 will be described with reference to FIG. 2. FIG. 2 schematically shows a graph representing transmission signal characteristics according to a variation of the number of the subchannels in the communication system. In FIG. 2, a horizontal axis shows the number of subchannels used in the terminal, and a vertical axis denotes a power level [dB].

The terminal may use one subchannel to all subchannels to satisfy various data rates and service qualities. As shown in FIG. 2, the transmission power of an output signal of the modulator 100 shown in FIG. 1 increases when the number $N_{SCH}$ of subchannels used in the terminal increases, and it decreases when the number $N_{SCH}$ of subchannels decreases. For example, the power in a case of the 96 subchannels increases by 19.8 dB compared to the power in a case of 1 subchannel. That is, while the gain of the power amplifier 400 shown in FIG. 1 is fixed, the transmission power may vary by 19.8 dB according to the variation of the number of subchannels. Therefore, when the number of subchannels is limited, extra power may be generated by the limited number of subchannels.

As described, in the exemplary embodiment of the present invention, the extra power generated when the number of subchannels is limited may be used as the power concentration gain. In addition, a maximum PCG $PCG_{MAX}(N_{SCH})$ according to the number of subchannels is given as Math Figure 3.

$$PCG_{MAX}(N_{SCH}) = Power(N_{MAX\_SCH}) - Power(N_{SCH}) \quad \text{MathFigure 3}$$

Here, $N_{MAX\_SCH}$ denotes a total number of subchannels, $Power(N_{MAX\_SCH})$ denotes a power of the output signal of the modulator when all the subchannels are used, and $Power(N_{SCH})$ denotes a power of the output signal of the modulator when $N_{SCH}$ subchannels are used.

As shown in FIG. 2, the PCG increasing unit 220 may use the maximum 19.8 dB PCG when one subchannel is used, and may use the maximum 5 dB PCG when 30 subchannels are used.

A method for controlling the transmission power in the terminal according to the exemplary embodiment of the present invention will be described with reference to FIG. 3. FIG. 3 schematically shows a flowchart of the method for controlling the transmission power according to the exemplary embodiment of the present invention. In FIG. 3, it will be described that the terminal transmits an initial ranging signal.

As shown in FIG. 3, the open-loop power controller 500 shown in FIG. 1 of the terminal sets the gain Tx_Gain of the power amplifier 400 shown in FIG. 1 as an initial value Open_Loop_Gain in step S310, and the terminal amplifies power of the initial ranging signal by the power amplifier 400 and transmits the amplified initial ranging signal in step S320. Subsequently, the terminal waits for a response to the initial ranging signal from the base station for a predetermined time $T_{RSP\_wait}$ in step S330.

In this case, since the initial ranging signal does not satisfy a signal to interference and noise ratio (SINR) required by the base station when the transmission power of the initial ranging signal transmitted by the terminal is low, the base station may not demodulate the initial ranging signal and may not transmit the response signal. When the terminal does not receive the response to the initial ranging signal in step S340, the maximum gain detector 210 checks in step S350 whether the gain Tx_Gain of the power amplifier 400 is a maximum gain Max PA_Gain. When the gain Tx_Gain is not the maximum gain, the gain increasing unit 520 increases the gain Tx_Gain of the power amplifier 400 by a predetermined value Step1 to set the gain (Tx_Gain+Step1→Tx_Gain) again in step S360. The terminal uses the increased gain Tx_Gain to amplify the power of the initial ranging signal, transmits the amplified initial ranging signal in step S320, and repeatedly performs operations from the step S330.

In addition, when the gain Tx_Gain of the power amplifier 400 is the maximum gain Max PA_Gain, the terminal applies the PCG to the initial ranging signal in step S370. Since the gain Tx_Gain of the power amplifier 400 is fixed to the maximum value when the terminal is positioned outside the FLR, the transmission power may be controlled by the PCG. In this case, when the PCG is a digital value, the gain controller 230 may apply the PCG to the initial ranging signal before the initial ranging signal is input to the DAC 300 shown in FIG. 1. In addition, the terminal increases the PCG by a predetermined value Step2 and set the PCG (PCG+Step1→PCG) in step S380. In this case, the maximum value to which the PCG may increase is determined by the number of subchannels used in the initial ranging operation as described in Math Figure 3. Subsequently, the terminal transmits the initial ranging signal in step S320 to which the PCG is applied in step S370, and repeatedly performs operations from the step S330.

When the initial ranging signal satisfies the SINR required by the base station, the base station may demodulates the initial ranging signal and transmit the response signal. As described, when the terminal receives the response to the initial ranging signal in step S340, the terminal may perform the initial ranging in step S390.

According to the exemplary embodiment of the present invention, when the terminal uses the maximum gain of the power amplifier, the open-loop power control operation may be performed by controlling the power concentration gain. Accordingly, the terminal positioned outside the FLR may normally perform the initial ranging operation. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

The invention claimed is:

1. A terminal comprising:
   a power amplifier for amplifying transmission power of a transmission signal;
   an open-loop power controller for measuring a received signal strength to control the transmission power, and increasing a gain of the power amplifier according to the received signal strength; and
   a gain controller for setting a power concentration gain and applying the power concentration gain to the transmission signal when the gain of the power amplifier is maximized.

2. The terminal of claim 1, wherein the power concentration gain is determined by extra power generated by the number of subchannels used in the transmission signal by the terminal.

3. The terminal of claim 2, wherein a maximum value of the power concentration gain is determined by a difference between power for the number of subchannels used in the transmission signal and power for all subchannels.

4. The terminal of claim 1, wherein, when the terminal does not receive a response to the transmission signal, the open-loop power controller increases the gain.

5. The terminal of claim 1, wherein, when the terminal does not receive a response to the transmission signal after applying the power concentration gain to the transmission signal, the gain controller increases the power concentration gain and applies the increased power concentration gain to the transmission signal.

6. The terminal of claim 1, further comprising:
a modulator for modulating the transmission signal; and
a digital/analog converter for converting an input signal to an analog signal, wherein the gain controller applies the power concentration gain to the transmission signal modulated by the modulator, and transmits the transmission signal to which the power concentration gain is applied to the digital/analog converter.

7. The terminal of claim 1, wherein the transmission signal is an initial ranging signal.

8. A method for controlling transmission power in a terminal, the method comprising:
transmitting a transmission signal after amplifying transmission power of the transmission signal by applying a first gain to the transmission signal;
checking whether the first gain is a maximum value when receiving no response to the transmission signal; and
applying a second gain to the transmission signal when the first gain is the maximum value.

9. The method of claim 8, further comprising:
increasing the second gain when there is no response to the transmission signal to which the second gain is applied; and
applying the increased second gain to the transmission signal.

10. The method of claim 8, wherein a maximum value of the second gain is determined by the number of subchannels used in the transmission signal by the terminal.

11. The method of claim 8, wherein the second gain is determined by extra power generated according to the number of subchannels used in the transmission signal by the terminal.

12. The method of claim 8, further comprising
increasing the first gain when the first gain is not the maximum value.

13. The method of claim 8, wherein the applying comprises:
modulating the transmission signal;
applying the second gain to the modulated transmission signal; and
converting the transmission signal to which the second gain is applied to an analog signal.

14. The method of claim 8, wherein the transmission signal is an initial ranging signal.

15. The method of claim 8, wherein the transmitting comprises
amplifying the transmission power through an open-loop power controlling operation.

16. A recording medium recording a program for realizing a method by a terminal, the method comprising:
converting a digital transmission signal to an analog transmission signal;
transmitting the analog transmission signal after amplifying transmission power by applying a first gain to the analog transmission signal;
checking whether the first gain is a maximum value when receiving no response to the analog transmission signal; and
setting a second gain and applying the second gain to the digital transmission signal when the first gain is the maximum value.

* * * * *